(12) United States Patent
Yao et al.

(10) Patent No.: US 11,277,845 B2
(45) Date of Patent: Mar. 15, 2022

(54) METHOD AND NETWORK NODE FOR RADIO RESOURCE ALLOCATION

(71) Applicant: Telefonaktiebolaget LM Ericsson (publ), Stockholm (SE)

(72) Inventors: Pu Yao, Beijing (CN); Qingyu Miao, Beijing (CN); Jiying Xu, Beijing (CN); Wei Wang, Beijing (CN); Jie Chen, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 129 days.

(21) Appl. No.: 16/645,827

(22) PCT Filed: Sep. 18, 2017

(86) PCT No.: PCT/CN2017/102064
§ 371 (c)(1),
(2) Date: Mar. 10, 2020

(87) PCT Pub. No.: WO2019/051830
PCT Pub. Date: Mar. 21, 2019

(65) Prior Publication Data
US 2020/0205162 A1 Jun. 25, 2020

(51) Int. Cl.
*H04W 72/08* (2009.01)
*H04B 17/336* (2015.01)
(Continued)

(52) U.S. Cl.
CPC ........ *H04W 72/082* (2013.01); *H04B 17/336* (2015.01); *H04L 1/189* (2013.01); *H04W 72/0413* (2013.01); *H04W 72/0446* (2013.01)

(58) Field of Classification Search
CPC ............. H04W 72/04; H04W 72/0446; H04W 72/082; H04W 72/0413; H04L 1/189; H04L 1/08; H04B 17/336
See application file for complete search history.

(56) References Cited

U.S. PATENT DOCUMENTS

2016/0007377 A1 1/2016 Frenne et al.
2017/0135066 A1 5/2017 Vos et al.
(Continued)

FOREIGN PATENT DOCUMENTS

WO WO 2016/015213 A1 2/2016

OTHER PUBLICATIONS

International Search Report and Written Opinion of the International Searching Authority, PCT/CN2017/102064, dated Jun. 13, 2018, 9 pages.

(Continued)

*Primary Examiner* — Brian D Nguyen
(74) *Attorney, Agent, or Firm* — Christopher & Weisberg, P.A.

(57) ABSTRACT

The present disclosure relates to a network node and a method performed by the network node for radio resource allocation. The method includes allocating a number of subframes to a first terminal device for uplink transmission, in which the first terminal device repeatedly transmits its data to the network node for N times, wherein N is an integer greater than 1. Then the network node decodes the data received from the first terminal device after the data has been received for M times, wherein M is an integer smaller than N; and records, after the received data from the first terminal device is successfully decoded, rest of subframes being allocated to the first terminal device as recycling uplink resource. The recycling uplink resource can be reused by other communication links although been allocated to the first terminal device, thus radio resource can be utilized more efficiently.

17 Claims, 4 Drawing Sheets

(51) Int. Cl.
 *H04L 1/18* (2006.01)
 *H04W 72/04* (2009.01)

(56) References Cited

U.S. PATENT DOCUMENTS

| | | | |
|---|---|---|---|
| 2017/0163396 A1 | 6/2017 | Blankenship et al. | |
| 2017/0214495 A1 | 7/2017 | von Elbwart et al. | |
| 2020/0213901 A1* | 7/2020 | Yoshimoto | H04L 1/189 |
| 2020/0296712 A1* | 9/2020 | Futaki | H04W 16/00 |
| 2020/0322923 A1* | 10/2020 | Yasukawa | H04W 4/44 |
| 2021/0029631 A1* | 1/2021 | Kim | H04W 72/0446 |
| 2021/0051626 A1* | 2/2021 | Baghel | H04W 72/00 |
| 2021/0126747 A1* | 4/2021 | Kim | H04W 74/0833 |
| 2021/0127361 A1* | 4/2021 | Yasukawa | H04W 28/26 |
| 2021/0144684 A1* | 5/2021 | Yang | H04W 4/70 |
| 2021/0144730 A1* | 5/2021 | Wang | H04W 72/12 |
| 2021/0160016 A1* | 5/2021 | Takeda | H04W 28/04 |

OTHER PUBLICATIONS

Extended European Search Report, EP 17925297.8 (PCT/CN2017/102064), dated Jul. 30, 2020, 13 pages.
"HARQ design for URLLC," (R1 1612079) 3GPP TSG-RAN WG1 #87, Nov. 14-18, 2016, Reno, NV, USA, Agenda Item 7.1.4.4, Qualcomm Incorporated (XP051176039) 7 pages.
"Semi-Persistent Scheduling for 5G New Radio URLLC," (R1-1609748) 3GPP TSG-RAN WG1 #86bis, Oct. 10-14, 2016, Lisbon, Portugal, Agenda Item 8.1.7.2, Nokia, Alcatel-Lucent Shanghai Bell (XP051149781) 6 pages.
"On Hybrid ARQ Functionality for 5G," (R1-165373) 3GPP TSG-RAN WG1 #85, May 23-27, 2016, Nanjing, P.R. China, Agenda Item 7.1.7, Nokia, Alcatel-Lucent Shanghai Bell, (XP051096651) 3 pages.

\* cited by examiner

METHOD AND NETWORK NODE FOR RADIO RESOURCE ALLOCATION

CROSS REFERENCE TO RELATED APPLICATIONS

This application is a 35 U.S.C. § 371 national stage application of PCT International Application No. PCT/CN2017/102064 filed on Sep. 18, 2017, the disclosure and content of which is incorporated by reference herein in its entirety.

FIELD OF THE INVENTION

The present disclosure generally relates to wireless communications, and more specifically, to radio resource allocation.

BACKGROUND

This section introduces aspects that may facilitate a better understanding of the disclosure. Accordingly, the statements of this section are to be read in this light and are not to be understood as admissions about what is in the prior art or what is not in the prior art.

In wireless communications, repetition is widely used in cellular Internet-of-Things (IoT) system to enhance cell coverage, such as machine type communication (MTC), or Narrow-Band-IoT (NB-IoT). Transmission blocks will first be encoded and mapped to multiple subframes, and then repeat in time domain. On the receiver side, by combining these repeated transmission blocks together, Signal to Interference plus Noise Ratio (SINR) can be improved. Terminal device located with poor communication quality is estimated to adopt large repetition number while terminal device located in geometry with good communication quality is estimated to adopt small repetition number.

Repetition improves SINR for devices located in poor geometry, however, it leads to unfairness for cell resource allocation. To achieve same data rate, much more resource is consumed by a poor geometry terminal device than a good geometry terminal device. Terminal device with poor geometry might occupy all cell resource for a long time due to the large repetition number, and no other devices could be scheduled before the poor geometry device finish its transmission. This limits the cell capacity significantly.

Another problem is that granularity of repetition number is large and it cannot reflect the channel condition precisely. Once link adaption becomes conservative, larger repetition level is often selected than actually needed, thus substantial amount of resources will be wasted. For example, in NB-IoT system, 3GPP define 8 granularities of resource unit (RU) number (1, 2, 3, 4, 5, 6, 8, 10) and 8 repetition level (1, 2, 4, 8, 16, 32, 64, 128) for Narrow Physical Uplink Shared Channel (NPUSCH). If RU number is determined as 10, and repetition number is estimated as 70 for one transmission block (TB), the repetition number would be determined as 128 by link adaption, since 64 as repetition number is apparently not enough for a certain level of SINR. In this case, 128−70=58 times of repetition might be redundant, and resource occupied by 58*10=580 RU is wasted.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

The present disclosure proposes a solution of radio resource re-allocation in a wireless communication network. A network node is enabled to start decoding its received data from a terminal device before the data transmission is supposed to come to an end, and when the data is successfully decoded, redundant radio resource having been allocated to a terminal device can be reused by another terminal device. Radio resource is more efficiently used and cell capacity is enlarged. Specifically, the data transmission is supposed to be a transmission block being transmitted with a number of repetition.

According to a first aspect of the present disclosure, a method implemented in a network node is provided.

In a first embodiment, the method comprises: allocating a number of subframes to a first terminal device for uplink transmission, in which the first terminal device repeatedly transmits its data to the network node for N times, wherein N is an integer greater than 1; decoding the data received from the first terminal device after the data has been received for M times, wherein M is an integer smaller than N; and recording, after the received data from the first terminal device is successfully decoded, rest of subframes being allocated to the first terminal device as recycling uplink resource.

In a further embodiment, the method further comprises: after the recording, the method further comprises: in response to an uplink transmission need of a second terminal device, checking whether there is unallocated resource available for the second terminal device. And when there is not enough unallocated resource available, allocating, if there is recycling uplink resource left, the left resource to the second terminal device.

In another further embodiment, the method further comprises: in response to an uplink transmission need of a second terminal device, checking whether there is recycling uplink resource left or not; and allocating, if there is recycling uplink resource left, the left resource to the second terminal device.

According to a second aspect of the present disclosure, a network node for communicating with a number of terminal devices is provided.

In an embodiment of the network node, the network node comprises: a memory storing processor-executable instructions; and a processing system comprising one or more processors configured to execute the processor-executable instructions, causing the network node to:

allocate a number of subframes to a first terminal device for uplink transmission, in which the first terminal device repeatedly transmits its data to the network node for N times, wherein N is an integer greater than 1;

decode the data received from the first terminal device after the data has been received for M times, wherein M is an integer smaller than N; and record, after the received data from the first terminal device is successfully decoded, rest of subframes being allocated to the first terminal device as recycling uplink resource.

According to a third aspect of the present disclosure, a computer readable storage medium is provided. Instructions are stored in the medium that when a processing system of a network node runs the instruction, the network node would perform the above-mentioned steps.

According to those aspects of the present invention, uplink cell capacity of the network node can be increased, since substantial uplink resources can be reused to other terminal device(s) although it has been allocated to a terminal device especially with poor geometry by a conservative scheduling.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" refers to a network following any suitable communication standards, such as Next Radio (NR), long term evolution-advanced (LTE-A), LTE, wideband code division multiple access (WCDMA), high-speed packet access (HSPA), and so on. Furthermore, the communications between a terminal device and a network node in the wireless communication network may be performed according to any suitable generation communication protocols, including, but not limited to, the third generation (3G), the fourth generation (4G), 4.5G, the fifth generation (5G) communication protocols, and/or any other protocols either currently known or to be developed in the future.

The term "network node" refers to a network device in a wireless communication network via which a terminal device accesses to the network and receives services therefrom. The network device refers to a base station (BS), an access point (AP), a mobile management entity (MME), multi-cell/multicast coordination entity (MCE), a gateway, a server, a controller or any other suitable device in the wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, in an internet of things (IoT) scenario, the terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring and/or reporting on its operational status or other functions associated with its operation.

The terminal device may also refer to a mobile terminal, user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, and the like.

The terminal device may support device-to-device (D2D) communication, for example by implementing a 3GPP standard for sidelink communication, and may in this case be referred to as a D2D communication device.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication systems are widely deployed to provide various telecommunication services such as voice, video, data, messaging and broadcasts. To meet dramatically increasing network requirements on system capacity and data rates, one interesting option for communication technique development is to support multiple numerologies in a communication network. The term "numerology" may be used to refer to some parameters related to the radio resources for signal transmissions, such as the subcarrier spacing, the length or duration of a cyclic prefix (CP), the length or duration of an orthogonal frequency division multiplexing (OFDM) symbol, the number of symbols contained in a time slot, the time slot duration and/or the like.

To reuse redundant resources being allocated to those terminal devices with low SINR, principle and embodiments of the present disclosure will be described in detail. A process in a network node for radio resource allocation is described with reference to FIG. 1 according to one or more embodiments of the present invention.

Figure 1:
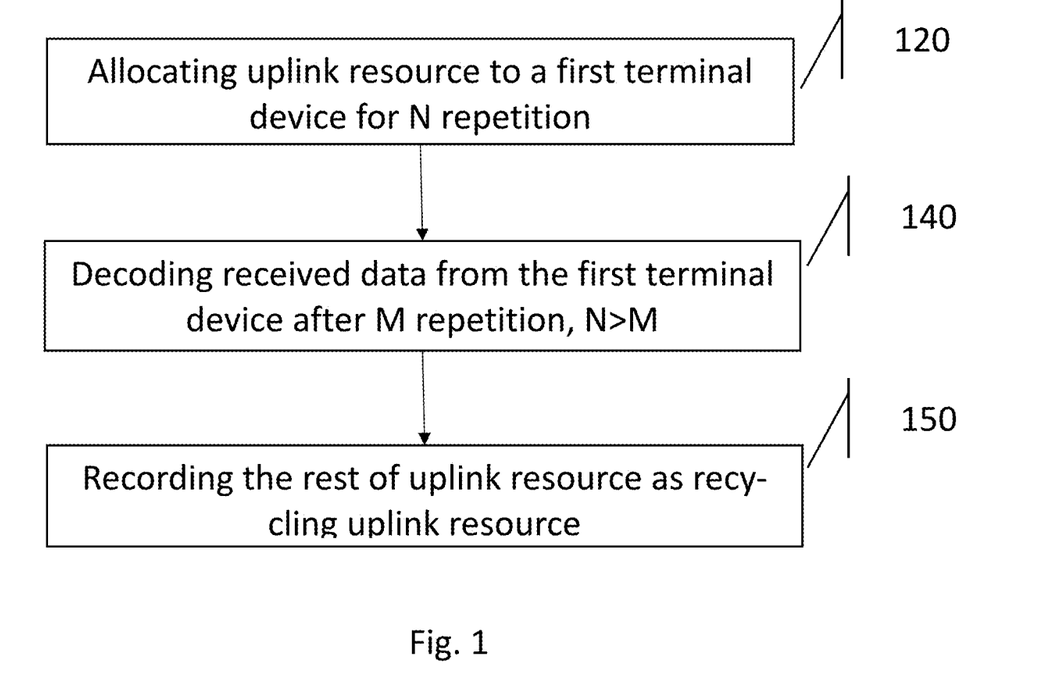
FIG. 1 illustrates an exemplary flow diagram for a resource allocating process in a network node according to one or more embodiments of the present disclosure.

In FIG. 1, at step 120, the network node allocates a number of subframes to a first terminal device for uplink transmission, in which the first terminal device repeatedly transmits its data to the network node for N times, wherein N is an integer greater than 1.

At step 140, the network node decodes the data received from the first terminal device after the data has been received for M times, wherein M is an integer smaller than N.

Follow the example in the background, if repletion number is estimated as 70, it is determined as 128 as a conservative way. In this example, N is 128 and M can be 70 or close to 70, such as 68 or 72.

At step 150, after the received data from the first terminal device is successfully decoded, the network node record rest of subframes being allocated to the first terminal device as recycling uplink resource.

Follow the example above, if M is determined as 68, when the network node fails to decode the received data from the first terminal device at the repetition number M, it keeps receiving data from the first terminal device, and trying to decode the received data in a periodical way, for example, every two or four repetitions, till the data is successfully decoded. For example, when the data is successfully decoded when the repetition number is 72, the rest of subframes allocated to repletion number 73 to 128 is redundant to the network node and can be recorded as recycling uplink resource. The network node can put the redundant resource in a recycle buffer, and stop receiving data from the first terminal device.

The steps 140 and 150 can be transparent to the first terminal device, thus the method does not need any change of actions for the first terminal device. After the received data is successfully decoded, the first terminal device need not to be aware of this, and it continues to transmit until all repetition is finished.

In a further scenario, the network node receives an uplink transmission need from a second terminal device. The uplink transmission need may be triggered by a Scheduling Request (SR), or a random access preamble (MSG1), or any other signaling asking for uplink resource, or it is a retransmission need. In another scenario, the uplink transmission need may be initiated by the network node for pre-scheduling.

At this time, recycling uplink resource is recorded and becomes available for other terminal devices, after step 150. In an embodiment, in response to the uplink transmission need, the network node takes precedence to allocate resource that is unallocated to a second terminal device. The unallocated resource is clean and there is less interference, whereas the recycling resource is still used by the first terminal device to keep its repetition and its transmission will interfere transmission of the second terminal device. Therefore, the unallocated resource, prior to the recycling resource, is allocated to the second terminal device. When unallocated resource is not enough, the recycling resource is considered, and be allocated to the second terminal device, which means same resource might be allocated to more than one terminal devices. In this scenario, the second terminal device gets some unallocated resource and some recycling resource.

Figure 2:
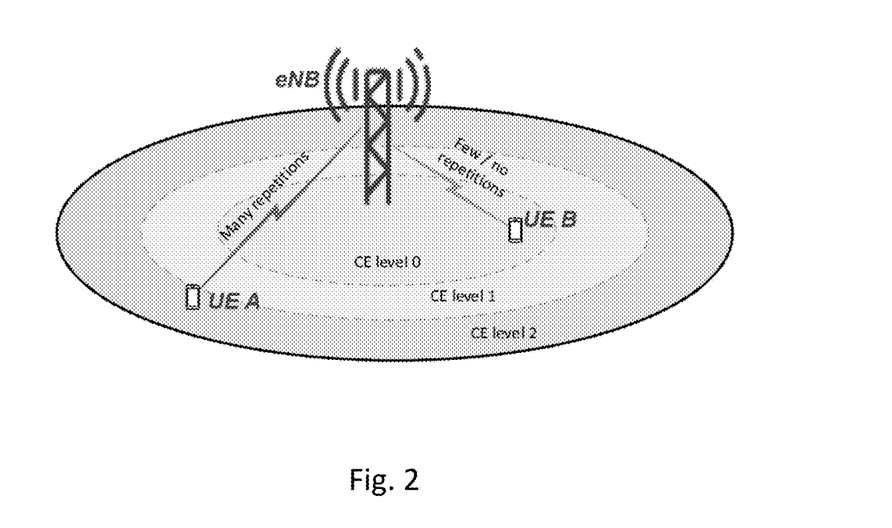
FIG. 2 shows a scenario when uplink resource is allocated to more than one terminal devices according to one or more embodiments of the present disclosure.

In an alternative embodiment, putting resource coordination in a more efficient way in response to an uplink transmission need, the network node takes precedence to allocate recycling resource to the second terminal device. With reference to FIG. 2, UE A locates at edge of an eNB's coverage, for example within a region with coverage enhancement (CE) level 2. UE A has been allocated uplink resource for many repetitions when it needs to transmit its data to the eNB, and part of the allocated uplink resource has been put into the recycling buffer. UE B locates at the center of the eNB's coverage, for example within a region with CE level 0. Because UE B has good communication quality, and UE A is far from UE B, UE A's continuous transmission in subframes mapping to recycling resource would be less harm to UE B's uplink than to another UE locating with poor communication quality. Therefore, to save clean resource to others who need more than UE B, the recycling resource would be prioritized to UE B.

In scenarios where resource is rather rare, such as Narrow Band system, the scheme can be set that the recycling resource is prioritized to any terminal device that requires uplink transmission, regardless of geometry or communication quality of the terminal device. Alternatively, when there is an uplink transmission need of a second terminal device, a network device determine which scheme is used, depending on geometer or communication quality of the second terminal device. For example, if the second terminal device is close to the coverage center, such as UE B in FIG. 2, recycling resource would be prioritized for the second terminal device. If the second terminal device is in a region of high CE level, such as UE A, clean resource would be prioritized for the second terminal device. Alternatively, when there is an uplink transmission need of a second terminal device, a network device randomly select a scheme for uplink resource allocation, which mean either unallocated resource or recycling resource would possible be prioritized to be allocated to the second terminal device.

When recycling resource is determined to be allocated to a second terminal device, link adaption is performed such as transmission format selection. A SINR back-off for the second terminal device can be adopted while transmission format is selected. Transmission format includes such as Modulation and Coding System (MSC) mode, encoded subframe number and repetition level. The SINR back-off means to apply a decreased value of the current SINR value of the second terminal device for transmission format selection. The current SINR value of the second terminal device can be obtained from historical information of previous communication and measurement with the second terminal device. A decreased value of the current SINR used for link adaption takes interference from the first terminal device into consideration. Repetition of transmission blocks from the first terminal device occupies an overlapped uplink resource with the second terminal device, thus interfere with uplink transmission of the second terminal device.

However, the second terminal device does not need to know whether the uplink resource allocated to itself is recycling resource or un-allocated resource. It does not need to aware of possible interference from another terminal device whose uplink resource has been reallocated to itself. Therefore, it is also transparent to the second terminal device. Determination and calculation such as link adaption or interference cancellation are also performed at network side, thus legacy terminal device can be applied to the procedure.

Figure 3:
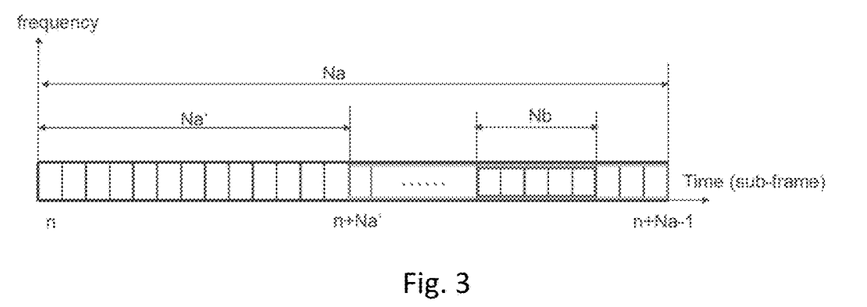
FIG. 3 illustrates subframe allocation according to an embodiment of the present disclosure.

FIG. 3 illustrates from resource angle a detailed embodiment of the present disclosure. A block of frequency and time resource (from subframe n to subframe n+Na−1) is first allocated to a first terminal device with repetition number Ra. Ra is determined to ceil to align with current standard specification as the actually determined repetition number. For example, referring back to the 8 repetition levels (1, 2, 4, 8, 16, 32, 64, 128), 32 is determined as Ra when ideally needed repetition number is estimated between 17 to 31. After receiving and combining a number of repetitions (Ra' repetitions with Na' subframes), the network node can successfully decode the data from the first terminal device. Ra' may be same to or slightly more than the repetition time that the network node begins to decode. Scheduler as the network node marks remaining resource from subframe n+Na' to subframe n+Na−1 as recycling resource. When another device has uplink transmission requirement, scheduler as the network node can allocates at least part of the remaining subframes to the other device, for example Nb subframes between subframe n+Na' to subframe n+Na−1.

Figure 4:
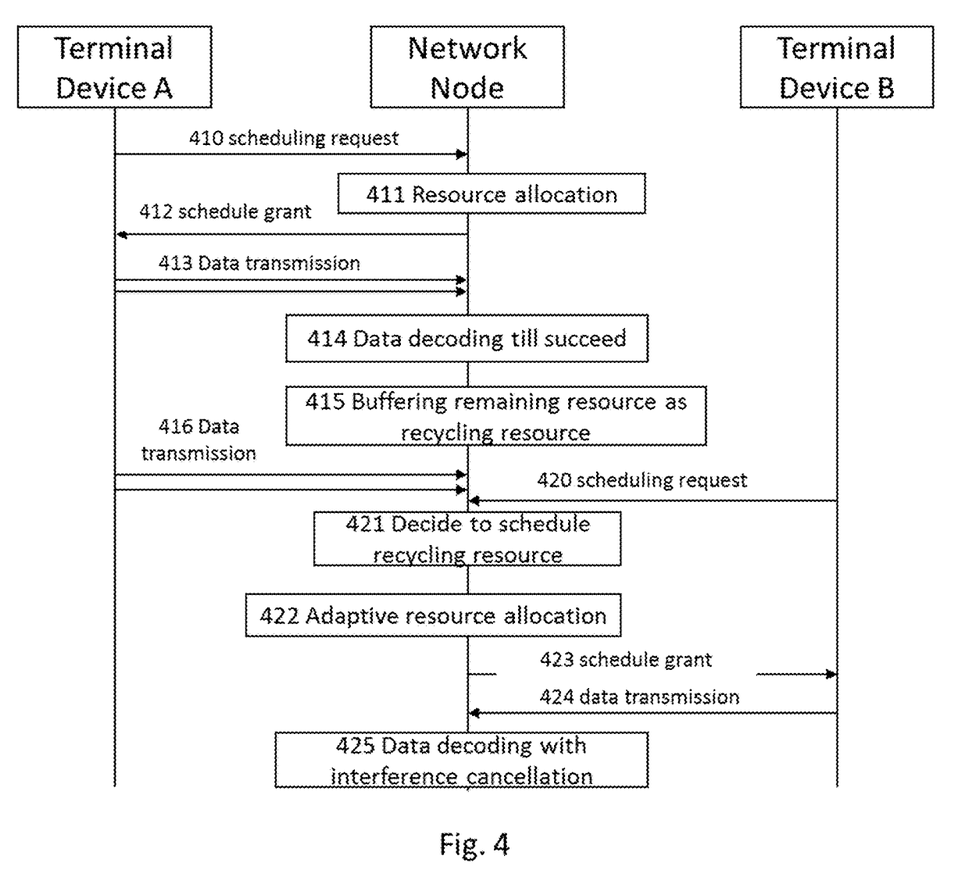
FIG. 4 illustrates signaling between terminal devices and a network node according to one or more embodiments of the present disclosure.

FIG. 4 illustrates interactions in chronological order with signaling between terminal devices and a network node according to one or more embodiments of the invention. At step 410, terminal device A sends a scheduling request to a network node. At step 411, the network node at first selects transmission format for device A. For example, the network node estimates hypothetical repetition number that device A needs according to its channel condition. If the estimation is Ra', the determination of repetition number is Ra which ceils to the corresponding repetition level in standard regulation. The network node also determines RU number so that subframe number needed for terminal A can be determined according to the following equation.

Subframe number=subframe per RU*RU number*repetition number

At step 411, after transmission format such as MSC, subframe number are determined, frequency and time resource, taking FIG. 3 as an example, subframe n to subframe n+NA−1 are allocated to terminal device A. At step 412, allocated resource and repetition level are informed to terminal device A in schedule grant.

At step 413, data from terminal device A is transmitted to the network node on granted resource and determined pattern. Meanwhile, the network node processes and combines the received signal on each subframe. At step 414, the network node tries to decode its combined signal, after a certain number of subframes. If decoding is not successful on the current try, the network node continues to process and combine received signal from terminal device A, and tries again after a number of transmission blocks, till data is successfully decoded. Referring to FIG. 3 as an example, the network node successfully decodes the data at subframe n+Na'. At step 415, the remaining resource having been allocated to terminal device A, for example subframe n+Na'+1 to subframe n+Na−1 in FIG. 3, is buffered as recycling resource.

At step 415 and 416, terminal device A keeps its data transmission as it does at step 413, and there's no need to be informed the successful decoding. In most of NB-IoT scenarios, communication on terminal device is half-duplex mode in time domain. When a terminal device is scheduled for uplink in certain time slot, it can't perform downlink in same slot. Therefore, even though the network node sends an acknowledgement on successful decoding to terminal device A, terminal device A can't receive the acknowledgement thus it won't stop repeatedly send its transmission blocks till all repetition is finished. Therefore, step 416 is not necessarily performed prior to step 420 and its subsequent steps, but may last till all repetition is finished.

At step 420, before subframe n+Na−1 in FIG. 3, the network node receives a scheduling request from terminal device B. Resource utilizing strategy can be varied as described above. When the first priority resource is the recycling resource, the network device will at first determine whether there is recycling resource in its buffer. If there is recycling resource in the buffer, the network node decides to schedule with the recycling resource. When the first priority resource is the unallocated resource, the network node would consider scheduling with the recycling resource only if the unallocated resource is not enough for the terminal device B. In another embodiment, the first priority resource is determined by the channel quality of the second terminal device. Supposing there are two terminal devices asking for uplink resource from the network device almost at the same time, the first priority resource for the terminal device with better communication quality can be the recycling resource whereas the first priority resource for the terminal device with worse communication quality can be the unallocated resource.

At step 422, after the decision of scheduling with recycling resource at step 421, resource allocation is adaptively performed. Hypothetical repetition number that device B needs is estimated and actual repletion number of transmission blocks of device B is determined, thus encoded subframe number then time slot is determined. The estimation of hypothetical repletion number would consider the interference from the terminal device A. MSC mode determination is based on a decreased SINR value of the terminal device B. In other words, a SINR back-off should be added to compensate the interference leftover. At step 423, schedule grant is sent to terminal device B and at step 424, based on the scheduled information, uplink transmission is performed which may last till all repletion is done.

At step 425, similar to step 414, the network tries to decode its combined signal after a certain number of subframes which may corresponds to the hypothetical repetition number of transmission blocks. In an improved embodiment, interference cancellation is performed during data decoding for cancel the interference from terminal device A. Historical information of recycled resource can be considered for interference cancelling. Historical information would comprise one of more of: grant information of the first terminal device, and decoded information from the first terminal device such as bit content of the transmission block. Thus, it would be more accurate for interference cancellation when the interference source is known. After step 425 that the data decoding succeeds, similar actions as step 415 would be continued by the network node.

Figure 5:
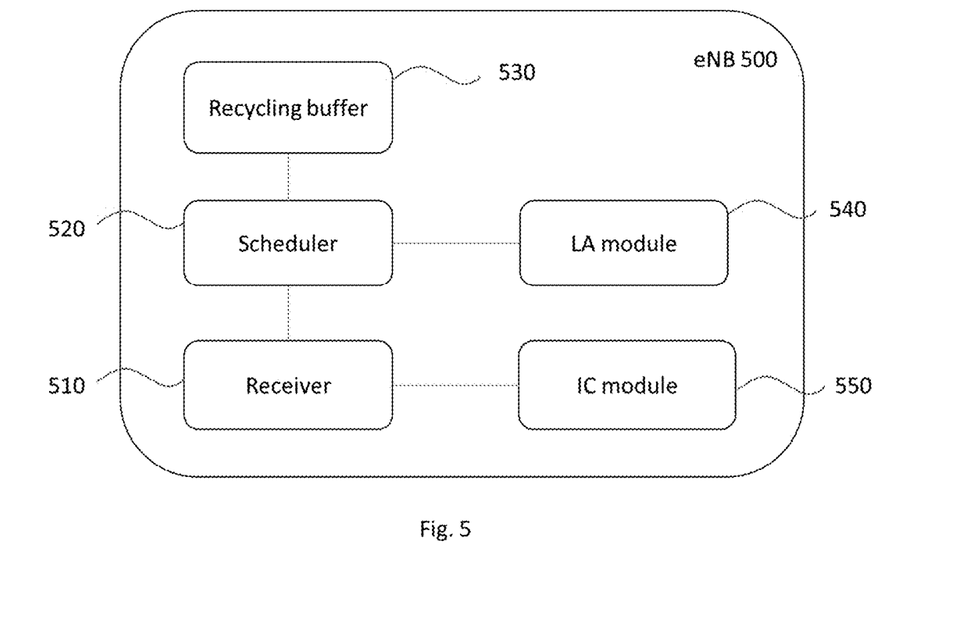
FIG. 5 schematically shows a block diagram of an eNB according to one or more embodiments of the present disclosure.

FIG. 5 schematically shows a block diagram of an eNB 500 according to one or more embodiments of the present invention. It may for example correspond to the network node described in connection with FIG. 4.

In FIG. 5, after Receiver 510 receives scheduling request from terminal device A in step 410, LA module 540 provide information to Scheduler 520 for resource allocation in step 411. Recycling buffer stores grant information of terminal device A from Scheduler 520. Transmitter is not showed in FIG. 5 for schedule grant in step 412. Receiver 510 continues to receive repeated transmission block from terminal device A, and tried to decode the combined signal till succeed. After that, Recycling buffer 530 has been buffered with the remained resource which had been allocated by Scheduler 520 to terminal device A in step 415, and Scheduler 520 had been indicated of the buffering. Decoded information of terminal device A is also stored in Recycling buffer 530 (connection between Recycling buffer 530 and Receiver 510 is not shown in FIG. 5). When an uplink requirement from terminal device B arrives in step 420, Scheduler 520 determines resource to be allocated for terminal device B. When Scheduler 520 decides to use recycling resource in the buffer 530 for terminal device B in step 421, LA module 540 provides information for Scheduler in step 422. When Receiver 510 receives transmission blocks from terminal device B, interference cancellation (IC) module 550 provide for interference cancellation from terminal device A in step 425. The granted information and the decoded information of terminal device A stored in Recycling buffer 530 are delivered to IC module 550 as input for interference cancellation. The information can be delivered through Receiver 510 or directly transmitted from Recycling buffer 530 (connection is not shown).

Figure 6:
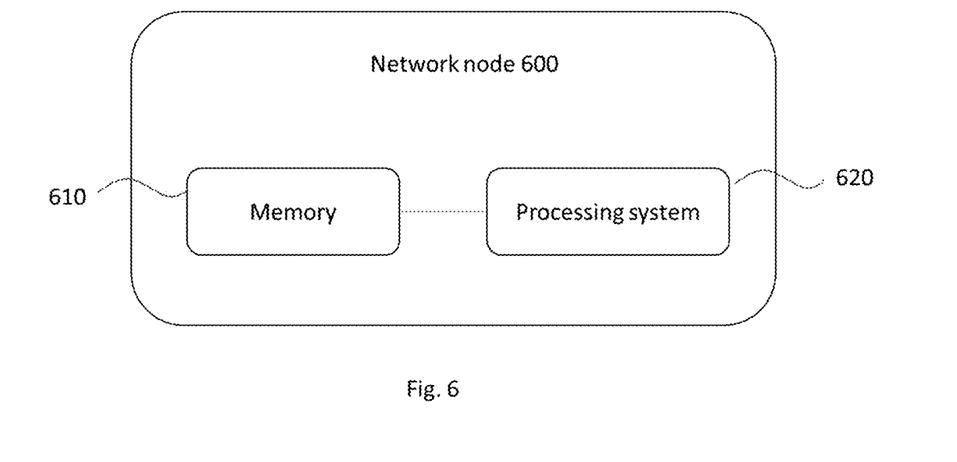
FIG. 6 schematically shows a block diagram of a network node according to one or more embodiments of the present disclosure.

It can be understood that those modules shown in FIG. 5 are functional modules. LA module 540 may be integrated in a same circuit with Scheduler 520, and IC module 550 would be integrated in a same circuit with Receiver 510. Receiver 510 would be interface functional module connected to antenna of the eNB. The modules may share a memory, or they may correspond to different processors, being configured to execute program code stored in the memory. FIG. 6 schematically shows a block diagram of a network node according to one or more embodiments of the invention.

As shown in FIG. 6, Network node 600 comprises a memory 610 storing computer processor-executable instructions and a processing system 620 configured to execute the instructions performing the steps of the method illustrated in any one of FIGS. 1 and 4. For example, the processing system 620 which includes one or more microprocessor or microcontrollers, as well as other digital hardware, which may include DSP, special-purpose digital logic, and the like. The microprocessors may be configured to execute program code stored in memory. Instructions stored in memory includes program codes for executing one or more telecommunications and/or data communications protocols as well as program codes for carrying out one or more of the techniques described herein, in several embodiments. For example, the memory 610 may include a ROM, e.g., a flash ROM, a RAM, e.g., a DRAM or SRAM, a mass storage, e.g., a hard disk or solid state disk, or the like. The memory 610 includes suitably configured program code to be executed by the processing system 620 so as to implement the above-described functionalities of the network node, or the eNB described in FIG. 5. In particular, the memory may include various program code modules for causing the network node to perform processes as described above, e.g., corresponding to the method steps of any one of FIGS. 1 and 4. The network node may also comprise at least one interface (not shown) for communicating with terminal devices or another access node, e.g. a wired or wireless interface. The interface could be coupled to the processing system. Information and data as described above in connection with the methods may be sent via the interface.

The present disclosure may also be embodied in the computer program product which comprises all features capable of implementing the method as depicted herein and may implement the method when loaded to the computer system. A set of software modules may correspond to a set of respective steps or actions in any method described in conjunction with FIGS. 1, 3-5, and it is appreciated for the person skilled in the art that the aforementioned modules could be implemented via Programmable Logic Device (PLD), Field Programmable Gate Array (FPGA), Application Specific Integrated Circuit (ASIC), and other implement mechanisms as software products, application specific firmware, hardware products and a combination thereof.

Similar to the effective uplink resource reuse, downlink resource would be also saved when conservative scheduling is performed. More specifically, Hybrid Automatic Repeat Request (HARQ) round-trip time (RTT) can be saved. HARQ RTT is determined when transmission format is selected by LA. For poor geometry users, repetition number would be higher than actually needed. Taking the current NB-IoT system as an example, there are 16 repetition level (1, 2, 4, 8, 16, 32, 64, 128, 192, 256, 384, 512, 768, 1024, 1536, 2048) for Narrow Physical Downlink Shared Channel (NPDSCH). Assuming repetition level is decided as 2048 while 1600 is the estimation result, and subframe number is determined as 10, around 4480 subframes would be wasted.

Figure 7:
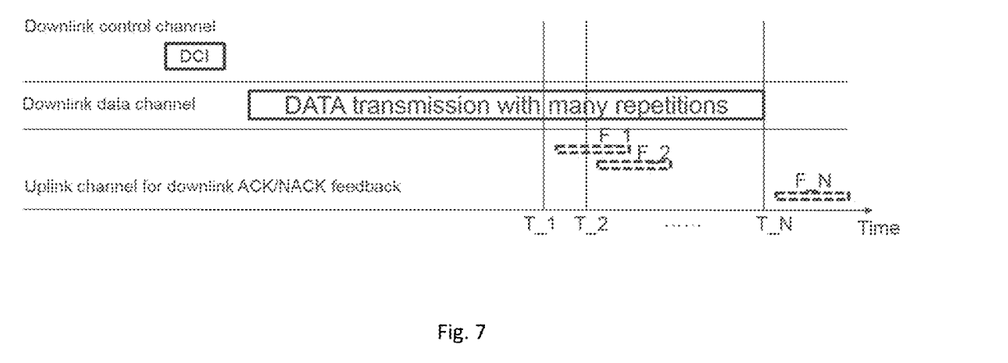
FIG. 7 illustrates a transmission sequence in a downlink repetition transmission according to one or more embodiments of the present disclosure.

An embodiment is provided to solve this problem. Referring to FIG. 7, a network node transmits information on Downlink Control Channel (DCI) format during its downlink scheduling for a terminal device. The information on DCI format indicates N occasions as time points $T\_1 \sim T\_N$ as shown in FIG. 7. Those N occasions indicates opportunities that the terminal device tries decoding the previous received repetitions. The DCI information also indicates N pieces of uplink resource for ACK/NACK feedback of each occasion, as shown $F\_1 \sim F\_N$ in FIG. 7.

When the terminal device receives and combines downlink signals over time, it begins to try to decode downlink data, when time point $T\_1$ comes. If result is negative which means received data cannot be successful decoded, the terminal device continues to do receiving and combining. The terminal device can send an NACK or keep silent as NACK default at the $F\_1$ occasion. And the network node continues its HARQ. If the terminal device has successfully decoded the received data after time point $T\_3$ comes, for example, it sends an ACK at the corresponding $F\_3$ occasion which follows the time point $T\_3$.

After the network node receives an ACK on resource $F\_n$, it considers the downlink transmission is finished, then stops left transmission (if any). Scheduler in the network node regards downlink resources after $F\_n$ as available. The corresponding downlink resource can be released and ready for another scheduling.

An alternative embodiment is provided for the solution of effective use of downlink resource. More bits to parameter indicating repetition level in DCI would decrease granularity and accuracy of repetition number can be increased. For example, 4 bits can represent the current 16 repetition level. If 2 more bits are added, 64 repetition levels can be achieved in between min repetition and max repetition number. This allow LA to select more accurate transmission format to adapt to channel condition.

The structure of the network node can refer to FIG. 5 and FIG. 6. Scheduler 520, LA module 540, Receiver 510 and non-shown Transmitter in FIG. 5 perform respective actions according to the above embodiments. Memory 610 in FIG. 6 stores computer readable instruction that is executed by Processing system 620, causing the network node to perform the above-mentioned steps. A terminal device whose structure is not shown performs the above-mentioned steps such as receive DCI format from the network node and begin to decode at an indicated time slot by the DCI format. And when received data is successfully decoded, it sends an acknowledgement to the network node such that the network node can end up its transmission before the scheduled repetition number is finished. Therefore, the allocated downlink resource can be released for other transmissions.

According to the above-mentioned embodiments, HARQ RTT can be decreased, and throughput is improved for the terminal device with poor channel condition. And from the angel of the network node, considerable downlink resource can be saved, and cell capacity can be increased.

What is claimed is:

1. A method in a network node for radio resource allocation, the method comprising:
    allocating a number of subframes to a first terminal device for uplink transmission, in which the first terminal device repeatedly transmits its data to the network node for N times, wherein N is an integer greater than 1;
    decoding the data received from the first terminal device after the data has been received for M times, wherein M is an integer smaller than N;
    recording, after the received data from the first terminal device is successfully decoded, rest of subframes being allocated to the first terminal device as recycling uplink resource,
    in response to an uplink transmission need of a second terminal device, checking whether there is unallocated resource available for the second terminal device; and
    when there is not enough unallocated resource available, allocating, if there is recycling uplink resource left, the left resource to the second terminal device.

2. The method according to claim 1, after the recoding, the method further comprises:
    in response to an uplink transmission need of a second terminal device, checking whether there is recycling uplink resource left or not;
    allocating, if there is recycling uplink resource left, the left resource to the second terminal device.

3. The method according to claim 1, the method further comprises:
    performing link adaption when the left resource has been allocated to the second terminal device.

4. The method according to claim 3, wherein the performing link adaption comprises:
    applying a decreased value of the current Signal to Interference plus Noise Ratio (SINR).

5. The method according to claim 1, the method further comprising:
    performing interference cancellation during the uplink transmission from the second terminal device, if the left resource had been allocated to the second terminal device.

6. The method according to claim 1, wherein decoding the data received from the first terminal device after the data has been received for M times comprises:
    trying to decode the data received from the first terminal device periodically, until the received data from the first terminal device is successfully decoded; and
    stopping receiving data from the first terminal device after the received data from the first terminal device is successfully decoded.

7. A network node for communicating with a number of terminal devices, the network node comprising:
    a memory storing processor-executable instructions; and
    a processing system comprising one or more processors configured to execute the processor-executable instructions, causing the network node to:
    allocate a number of subframes to a first terminal device for uplink transmission, in which the first terminal device repeatedly transmits its data to the network node for N times, wherein N is an integer greater than 1;
    decode the data received from the first terminal device after the data has been received for M times, wherein M is an integer smaller than N;
    record, after the received data from the first terminal device is successfully decoded, rest of subframes being allocated to the first terminal device as recycling uplink resource;
    after recording the rest of subframes as recycling uplink resource, check whether there is unallocated resource available for the second terminal device, in response to an uplink transmission need of a second terminal device; and
    when there is not enough unallocated resource available, allocate, if there is recycling uplink resource left, the left resource to the second terminal device.

8. The network node according to claim 7, the one or more processors are further configured to cause the network node to:
    after recording the rest of subframes as recycling uplink resource, check whether there is recycling uplink resource left or not, in response to an uplink transmission need of a second terminal device;
    allocate, if there is recycling uplink resource left, the left resource to the second terminal device.

9. The network node according to claim 8, the one or more processors are further configured to cause the network node to: perform link adaption when the left resource has been allocated to the second terminal device.

10. The network node according to claim 9, the network node is configured to: apply a decreased value of the current SINR.

11. The network node according to claim 10, the one or more processors are further configured to cause the network node to: perform interference cancellation during the uplink transmission from the second terminal device, if the left resource had been allocated to the second terminal device.

12. The network node according to claim 8, the network node is configured to:
    try to decode the data received from the first terminal device periodically, until the received data from the first terminal device is successfully decoded; and
    stop receiving data from the first terminal device after the received data from the first terminal device is successfully decoded.

13. The network node according to claim 7, the one or more processors are further configured to cause the network node to: perform link adaption when the left resource has been allocated to the second terminal device.

14. The network node according to claim 13, the network node is configured to: apply a decreased value of the current SINR.

15. The network node according to claim 7, the one or more processors are further configured to cause the network node to: perform interference cancellation during the uplink transmission from the second terminal device, if the left resource had been allocated to the second terminal device.

16. The network node according to claim 7, the network node is configured to:

try to decode the data received from the first terminal device periodically, until the received data from the first terminal device is successfully decoded; and stop receiving data from the first terminal device after the received data from the first terminal device is successfully decoded.

17. The network node according to claim 7, the network node is configured to:

try to decode the data received from the first terminal device periodically, until the received data from the first terminal device is successfully decoded; and stop receiving data from the first terminal device after the received data from the first terminal device is successfully decoded.

\* \* \* \* \*